(12) United States Patent
Lee et al.

(10) Patent No.: US 7,157,548 B2
(45) Date of Patent: Jan. 2, 2007

(54) CROSSLINKED SULFONATED POLYIMIDE FILMS

(75) Inventors: Young-Moo Lee, Seoul (KR); Ho-Burn Park, Seoul (KR); Chang-Hyun Lee, Seoul (KR)

(73) Assignee: Hanyang Hak Won Co., Ltd. (KR)

( * ) Notice: Subject to any disclaimer, the term of this patent is extended or adjusted under 35 U.S.C. 154(b) by 285 days.

(21) Appl. No.: 10/486,883

(22) PCT Filed: Aug. 21, 2002

(86) PCT No.: PCT/KR02/01583

§ 371 (c)(1),
(2), (4) Date: Feb. 17, 2004

(87) PCT Pub. No.: WO03/018669

PCT Pub. Date: Mar. 6, 2003

(65) Prior Publication Data

US 2004/0236038 A1 Nov. 25, 2004

(30) Foreign Application Priority Data

Aug. 22, 2001 (KR) ............................... 2001/50816
Jul. 5, 2002 (KR) ............................... 2002/38903

(51) Int. Cl.
*C08G 73/10* (2006.01)
(52) U.S. Cl. ..................... 528/373; 528/288; 528/293
(58) Field of Classification Search ................ 528/373, 528/288, 293
See application file for complete search history.

(56) References Cited

U.S. PATENT DOCUMENTS

| | | |
|---|---|---|
| 4,605,685 A | 8/1986 | Momose |
| 4,925,912 A | 5/1990 | Rohde |
| 5,153,303 A | 10/1992 | Jasne |
| 5,317,082 A | 5/1994 | Beuhler |
| 5,449,742 A | 9/1995 | Beuhler |
| 5,585,217 A * | 12/1996 | Oba .......................... 430/191 |
| 6,245,881 B1 | 6/2001 | Faure |

FOREIGN PATENT DOCUMENTS

EP 0300326 1/1989

* cited by examiner

*Primary Examiner*—Kuo-Liang Peng
(74) *Attorney, Agent, or Firm*—Dickstein Shapiro LLP

(57) ABSTRACT

The present invention relates to a new sulfonated polyimides, more specifically to new methods for preparing the polyimides, and cation exchange membranes containing the polyimides. The sulfonated polyimides of the presented invention have excellent proton conductivity and low preparation cost. In particular, the sulfonated polyimides can be used as polymer electrolyte membrane in hydrogen or direct methanol fuel cell for electric vehicles and portable power sources operated with electric energy

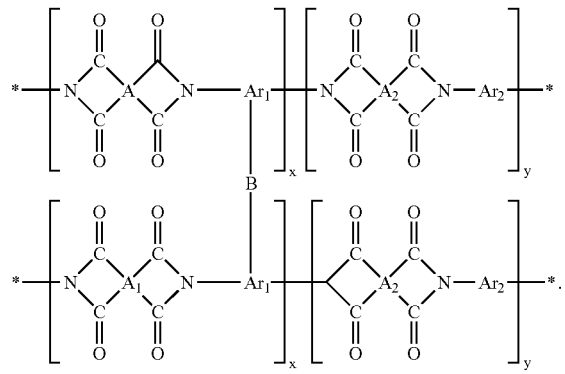

18 Claims, 1 Drawing Sheet

FIG.1

CROSSLINKED SULFONATED POLYIMIDE FILMS

FIELD OF THE INVENTION

The present invention relates to sulfonated polyimides, which can be applied for the preparation of ion exchange membranes of fuel cells.

BACKGROUND OF THE INVENTION

Fuel cells using solid polymer electrolytes were proposed in 1950s and have been developed ever since for the purpose of supplying spacecraft with energy.

Beyond the generation of power for spacecraft, interest in fuel cells has progressed. Particularly, the automobile industry has interest in them for two reasons. The first reason is related to the increased concern for avoiding pollution caused by internal combustion engines. In fact, it is very difficult to prevent all discharges caused by internal combustion engine, such as nitrogen oxides, hydrocarbons caused by incomplete combustion and acidic compounds by means of all the improvements that one can expect through better control of combustion. The second reason, for the long term, is to research motors that use fuel other than fossil fuel which is known not to last forever.

Any fuel cell system based on hydrogen or methanol can respond to the concerns mentioned above. The sources of fuel, hydrogen and methanol, are potentially inexhaustible and their electrochemical combustion only produce water.

Figure 1:
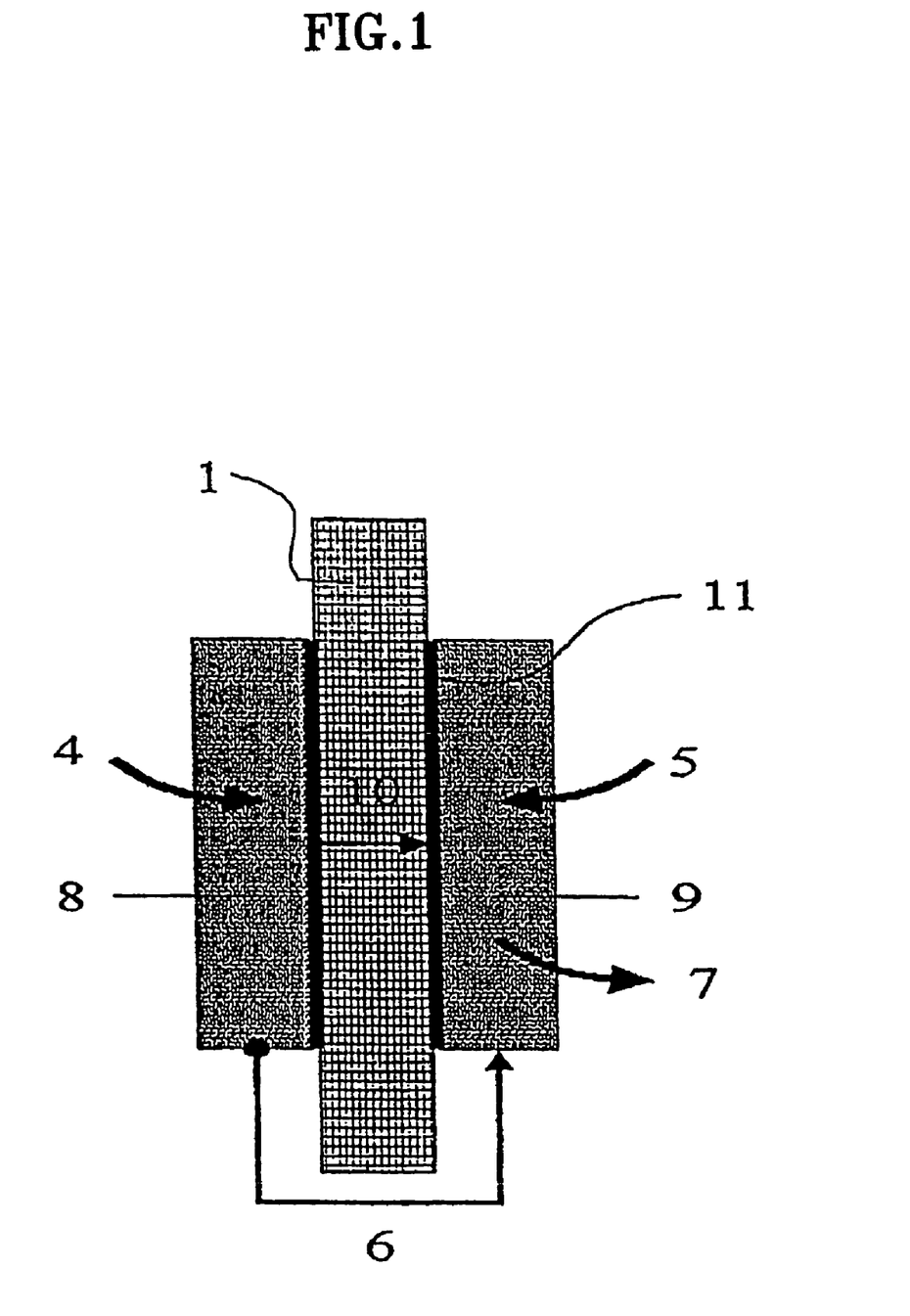
FIG. 1 represents a schematic membrane electrode assembly of a fuel cell producing electrical energy and water at the same time.

The schematic assembly of a fuel cell that produces electrical energy and water at the same time is represented in FIG. 1.

The ion exchange type of membrane formed from a solid polymer electrolyte (1) is used to separate the anode compartment (4) where oxidation of the fuel such as hydrogen or methanol occurs according to the equation:

2H$_2$->4H$^+$+4e$^-$ (hydrogen fuel cell)

CH$_6$OH+H$_2$O->CO$_2$+6H$^+$+6e$^-$ (direct methanol fuel cell)

from the cathode compartment (5) where the oxidant such as oxygen is reduced according to the equation:

O$_2$+4H$^+$+4e$^-$->2H$_2$O (hydrogen fuel cell)

3/2O$_2$+6H$^+$+6e$^-$->CO$_2$+2H$_2$O (direct methanol fuel cell)

with production of water (7) while the anode and the cathode are connected through external circuits(6).

The anode (8) and the cathode (9) are essentially constituted by a porous support, for example made of carbon, on which particles of a noble metal such as platinum or ruthenium are deposited.

The membrane-electrode assembly (MEA) is a very thin assembly with a thickness of the order of a millimeter. Each electrode is supplied from the rear with the gases using a fluted plate with serpentine flow path. One very important point is to properly maintain the membrane in an optimum hydrated state so as to ensure maximum proton conductivity.

The membrane has a double role. On one hand, it acts as a proton conducting polymer permitting the transfer of hydrated proton (H$_3$O$^+$) from the anode to the cathode. On the other hand, it effectively separates oxygen, hydrogen and/or methanol as a buffer. Therefore, the polymer constituting the membrane must therefore fulfill a certain number of conditions relating to its mechanical, physico-chemical and electrical properties.

First, the polymer must be able to be prepared into thin membranes with a thickness of 50 and 100 micrometers, which are dense and without defects. Its mechanical properties, especially tensile stress, modulus and flexibility must make it compatible with preparation condition of the MEA which is to be clamped between metal frames. Further, the properties must be conserved simultaneously from a dry to a hydrated state.

In addition, the polymer must have good thermal stability to hydrolysis and exhibit good resistance to reduction and oxidation up to 100° C. In particular, in order to be used for direct methanol fuel cell, the polymer electrolyte membrane must not allow methanol to pass through the membrane from anode to cathode.

Finally, the polymer must have high ionic conductivity, which is provided by acidic groups such as phosphoric acid groups and sulfonic groups linked to the polymer chain. Therefore, these polymers will generally be specified by their equivalent mass, that is to say, acid equivalent per the weight of polymer in grams (Ion Exchange Capacity).

Since 1950, numerous families of polymers or sulfonated polycondensates have been tested as electrolyte membranes for fuel cell. At present the relationships among chemical structure, film morphology and performance are established.

At first, sulfonated phenolic type resins prepared by sulfonation of polycondensed products such as phenol-formaldehyde resins were used.

The membranes prepared with these products are advantageous in terms of low cost, but they do not have sufficient stability to hydrogen at 50–60° C. for applications of long duration.

Next one turned towards sulfonated polystyrene derivatives which have greater stability in comparison with those of the sulfonated phenolic resins, but the sulfonated polystyrene derivatives are disadvantageous in that they cannot be used at a higher temperature than 50–60° C.

At the present time, the best results are obtained with copolymers that have linear perfluorinated main chain in back bone and graft side chains with sulfonic acid groups.

These copolymers are commercially available under the trademark Nafion from the Du Pont Company or ACIPLEX-S from Asahi Chemical Company. Others are experimental products, such as the membrane named "XUS" by the DOW Company.

Such polymers containing perfluorinated sulfonic acid groups, which have been the subject of numerous developments, conserve their properties for several thousands of hours between 80 and 100° C.

The polymers of the Nafion type can be obtained by co-polymerization of two fluorinated monomers one of which carries the sulfonic acid groups. Other routes for obtaining perfluorinated membranes have been explored in documents by G. G. Scherer: Chimia, 48 (1994), p. 127–137; and by T. Monose et al., U.S. Pat. No. 4,605,685. It involves the grafting of styrene or fluorinated styrene monomers onto previous sulfonated fluorinated polymers. These membranes have properties close to those of fluorinated co-polymers.

However, such Nafion type polymers may be limitedly applied in the manufacture of direct methanol fuel cell because methanol transfer from anode to cathode can easily occur even when that the concentration of methanol is very low, resulting in poor performance.

In addition, U.S. Pat. No. 6,245,881 shows various sulfonated polyimides prepared by copolymerization with diamine monomers having sulfonic acid groups. The publication reports that these sulfonated polyimides have excellent thermal stability and resistance to reduction, as well as high ion exchange capacity up to 2.5 meq/g.

However, there exist limited kinds of diamine monomers having sulfonic acid groups. In addition, the solubility and reactivity of those monomers are so poor that they cannot be easily resolved in most solvents except m-cresol, and the degree of polymerization is too low to form an adequate film.

The solubility of the monomers may be improved by substituting the hydrogen ion of the —SO$_3$H group by +1 metal ion such as Li+, Na+ and K+. These modified monomers become soluble in other solvents such as dimethylsulfoxide (DMSO). However, the polymers prepared from such monomers have poor solubility in most other solvents, and the metal substituted sulfonic acid group cannot be easily returned to its original form, SO$_3$H in order to be used as a cation exchange membrane.

Further, because of the strong rigidity of polyimides whose backbone structures are basically composed of aromatic monomers, the introduction of SO$_3$H groups into their main chains prevents the morphologies of the produced films from being uniform.

From the above, it can be known that the polymers for the manufacture of effective polymer electrolyte membranes must have high proton conductivity, excellent thermal and mechanical properties and low gas permeability. Also, their chemical structures must be able to prevent the leakage of fuel such as methanol.

SUMMARY OF THE INVENTION

The purpose of the present invention is to provide polymers, which can solve the above problems and meet the above requirements. The further purpose of the present invention is to provide membranes prepared with these polymers and fuel cells having these membranes.

In order to achieve the above purposes, the inventors formed a crosslinked sulfonated polyimide (Formula 2) by cross-linking the main chains of a polyimide composed of the repeat unit (Formula 1) using a cross-linking agent (B) having a sulfonic acid group.

Formula 1

Formula 2

BRIEF DESCRIPTION OF THE INVENTION

(1) shows a membrane formed from a solid polymer electrolyte,
(4) shows the anode compartment where oxidation reaction of the fuel occurs,
(5) shows the cathode compartment where the oxidant is reduced,
(6) shows an external circuit,
(7) shows the water produced,
(8) shows the anode of the fuel cell, and
(9) shows the cathode of the fuel cell.

DETAILED DESCRIPTION OF THE INVENTION

The present invention provides a sufonated polyimide comprising the repeating units of Formula 2. In Formula 1 and Formula 2, A$_1$ and A$_2$ can be identical or different. Each formula represents i) a tetravalent aromatic radical which includes at least one aromatic carbon ring having 6 to 10 carbon atoms and is substituted by one or more substituents chosen from among alkyl and alkoxy groups having 1 to 10 carbon atoms and halogen atoms, or ii) a tetravalent aromatic radical which includes at least one aromatic carbon ring having 5 to 10 atoms including one or more heteroatom(s) chosen from among S, N and O and is substituted by one or more groups chosen from among alkyl and alkoxy groups having 1 to 10 carbon atoms and halogen atoms.

Examples of groups A$_1$ and A$_2$ are represented in the following structures (1)–(27).

(1)

-continued

(21)

(22)

(23)

(24)

(25)

(26)

(27)

The heteroatoms are chosen from the following groups.

The $Ar_1$ is a divalent aromatic radical or a mixture of divalent aromatic radicals substituted by —CO— group(s) or —O— group(s).

Examples of $Ar_1$ groups are represented in the following structures (28)–(34).

(28)

(29)

(30)

(31)

(32)

(33)

(34)

(33-a)

The $Ar_2$ is i) a divalent aromatic radical which includes at least one aromatic carbon ring having 6 to 10 carbon atoms and is substituted by one or more substituents chosen from among alkyl and alkoxy groups having 1 to 10 carbon atoms and halogen atoms, or ii) a divalent aromatic radical which includes at least one aromatic carbon ring having 5 to 10 atoms including one or more heteroatoms chosen from among S, N and O and is substituted by one or more substituents chosen from among alkyl and alkoxy groups having 1 to 10 carbon atoms and halogen atoms.

Examples of the Ar2 are represented in the following structures (35)–(76).

-continued

(46)

(47)

(48)

(49)

(50)

(51)

(52)

(53)

(54)

(55)

(56)

(57)

(58)

(59)

(60)

(61)

(62)

(63)

(64)

(65)

(66)

(67)

(68)

(69)

(70)

(71)

(72)

(73)

(74)

(75)

(76)

The B is a divalent aliphatic radical with a N atom, having a sulfonic acid group —SO₃H and two or more groups selected from the group consisting of ether group —O— and carbonyl group —CO—. Examples of the B are as follows. (77–80)

(77)

-continued (78)

(79)

(80)

As a catalyst for the crosslinking reaction, 1-[3-(dimethylamino)propyl]-3-ethylcarbodiimide hydrochloride (EDC) can be used if the crosslinking is formed by ester bonding, while NaH or PPh3 can be used if the crosslinking is formed by ether bonding.

The X and Y, repeating number of the repeating unit respectively, are a whole number from 2 to 20 and a whole number from 2 to 30, in order.

The molecular weights of the polyimides according to the present invention range from 10,000 to 100,000 and more preferably from 20,000 to 70,000.

The sulfonated polyimide according to the present invention, with a crosslinked structure of the main chain, has an improved thermal stability and an excellent mechanical property. The sulfonated polyimide of the present invention is resistant to hydrolysis in acidic condition and has excellent stability in high temperatures such as above 100° C. and good durability.

In the present invention, strong acid functional groups such as sulfonic acid group are introduced into the polyimide by a crosslinking reaction, which solves the problem of the conventional method to prepare sulfonated polyimide in which direct sulfonation in strong acid condition leads to chain scission of the main chain of the polymer, and thus, film formation is prevented. In addition, in the present invention, the main chains of the polyimide can be crosslinked by an aliphatic compound with a sulfonic acid group. In this regard, the polymer may effectively incorporate an ion exchangeable functional group and be used as a cation exchange membrane.

The polyimide according to the present invention has a high ion exchange capacity (IEC) above 0.4 meq/g. A polyimide with ion exchange capacity higher than 1.17 meq/g may be prepared by controlling the amount of the crosslinking agent.

As the crosslinking reaction result in limiting the distances among the main chains and increasing the rigidity of the polymers, relatively larger molecules such as methanol cannot permeate through the polymers. In addition, the polyimides according to the present invention have good thin film-forming characteristics and excellent resistance to reduction and oxidation.

Because of the above mentioned properties, the polyimides according to the present invention may fully meet the requirements for the polymer electrolyte membrane, which is an important part in a fuel cell.

The polymer electrolyte membrane prepared using the present invention has a very different structure in comparison with those of the conventional ones. More specifically, the present invention provides very different type of polymers for cation exchange membrane, in particular, polymer electrolyte membrane for fuel cell, compared with the polymers used in the art.

In particular, the polyimides according to the present invention can be prepared by methods which are generally used for an industrial scale at a relatively lower cost. Thus, it can be expected that the present invention can lower the cost of the membrane or the MEA.

FIG. 1 schematically shows a polymer electrolyte fuel cell and its main constitutional element—a membrane electrode assembly.

The polyimide according to the present invention can be prepared by any methods known to a person skilled in the art for the preparation of polyimides in general.

Examples of known methods for the preparation of polyimides are as follows:
(1) reaction of a di-anhydride and a di-amine
(2) reaction of a di-acid diester and a di-amine.

It is obvious that the polyimides according to the invention can be prepared by the methods derived from the previously mentioned methods or by other methods that can be used for the synthesis of polyimides.

A person skilled in the art can easily carry out a modification or optimization of the methods known and described in the literature.

The crosslinked polyimide of the present invention may be obtained by preparing a polyimide in a two-step condensation process using a di-anhydride and a di-amine and then crosslinking the obtained polyimide with a crosslinking agent.

In an alternative method, a di-amine reacts with a crosslinking agent having a sulfonic acid group using a catalyst and then condenses with a di-anhydride. The polyimide of the present invention may be prepared by copolymerization with this condensed product and a polyimide obtained from condensation of a di-amine and a di-anhydride, which are respectively the same or different type of the above ones.

These methods, which are currently used in an industrial scale, may be used in order to prepare the polyimides of the present invention with just a slight modification.

The following examples include several methods for preparing the condensed polyimides of the present invention. However, the scope of the invention is not limited to these examples.

EXAMPLE 1

A 250 ml reactor fitted with a Teflon stirring system, an inlet for an inert gas, such as nitrogen, and a sample inlet was prepared to carry out polyimide condensation reaction and placed in an oil bath to constantly maintain the reaction temperature.

The reactor was charged with 0.61 g (4 mmol) of 3,5-diamino benzoic acid (DBA) and added by N-methyl pyrrolidone (NMP) as a solvent. After complete dissolution, 3.22 g (10 mmol) of 3,3,4,4-benzophenone tetracarboxylic dianhydride (BTDA) powder was slowly added into the solution. After the reaction was maintained for about 1 hour, 1.20 g (6 mmol) of oxydianiline (ODA) was further added. After the reaction was maintained for 3 hours, a deep brown viscous solution was obtained. This solution was slowly added by a solution of 0.43 g (2 mmol) of N,N-bis (2-hydroxyethyl)-2-aminoethane sulfonic acid (BES) powder in NMP and maintained for 1 hour at 60–90° C.

The solution was casted on a glass plate and oven-cured for 2 hours at 110° C., for 1 hour at 150° C., for 1 hour at 200° C. and for 1 hour at 250° C., in sequence. Then, vacuum drying was carried out in a vacuum oven at 60° C. for 24 hours in order to completely remove the residual solvent. A transparent sulfonated polyimide membrane with an ion exchange capacity (IEC) of 1.19 meq/g was obtained.

EXAMPLE 2

The method of Example 1 was used to prepare a sulfonated polyimide by reacting 0.76 g (5 mmol) of DBA, 3.22 g of BTDA (10 mmol), 1 g of ODA (5 mmol) and 0.53 g of BES (2.5 mmol). The IEC of the obtained membrane was 1.25 meq/g.

EXAMPLE 3

The method of Example 1 was used to prepare a sulfonated polyimide by reacting 0.91 g (6 mmol) of DBA, 3.22 g of BTDA (10 mmol), 0.8 g of ODA (4 mmol) and 0.64 g of BES (3 mmol). The IEC of the obtained membrane was 1.33 meq/g.

EXAMPLE 4

The method of Example 1 was used to prepare a sulfonated polyimide by reacting 1.07 g (7 mmol) of DBA, 3.22 g of BTDA (10 mmol), 0.6 g of ODA (3 mmol) and 0.75 g of BES (3.5 mmol). The IEC of the obtained membrane was 1.41 meq/g.

EXAMPLE 5

The method of Example 1 was used to prepare a sulfonated polyimide by reacting 1.22 g (8 mmol) of DBA, 3.22 g of BTDA (10 mmol), 0.4 g of ODA (2 mmol) and 0.85 g of BES (4 mmol). The IEC of the obtained membrane was 1.48 meq/g.

EXAMPLES 6–10

In these Examples, the proton conductivities of the membranes of polyimides having sulfonic acid groups were obtained by measuring their A.C. impedances at 30° C., 45° C., 60° C., 75° C. and 90° C. using galvanostatic four-point probe electrochemical impedance spectroscopy technique and calculating their proton conductivities using the following equation. Table 1 shows the proton conductivities calculated from the measured impedances of the sulfonated polyimide membranes prepared from Examples 1 to 5, $$R = \rho \frac{l}{S}$$

{R=resistance (Ω), ρ: specific resistance, l: the distance between the electrodes (cm), S: effective surface area(cm$^2$)}

$$\frac{1}{\rho} = \sigma = \frac{l}{RS}$$

{σ: conductivity (1/Ω cm=S/cm)}

TABLE 1

| | * proton conductivity ($10^{-3}$ S/cm) | | | | |
|---|---|---|---|---|---|
| | 30° C. | 45° C. | 60° C. | 75° C. | 90° C. |
| Example 6 | 4.95 | 5.76 | 8.02 | 9.39 | 11.30 |
| Example 7 | 9.68 | 11.80 | 14.65 | 18.23 | 22.49 |
| Example 8 | 15.74 | 19.83 | 22.77 | 27.92 | 32.44 |
| Example 9 | 22.32 | 25.37 | 26.84 | 29.56 | 35.67 |
| Example 10 | 28.10 | 33.97 | 39.38 | 47.43 | 78.82 |

EXAMPLES 11–15

The Examples relate to the application of the polyimide membrane having a sulfonic acid group according to the present invention as a proton exchange membrane of a direct methanol fuel cell.

In order to evaluate the methanol crossover, each of the sulfonated polyimide membranes prepared from the Examples 1–5 was cut to 4 cm in diameter and then adhered to a silicon rubber ring 4 cm in external diameter and 2.5 cm in internal diameter using epoxy adhesive, which was then positioned in a two chamber diffusion cell and closely sealed.

One of the two chambers was filled with distilled water and the other was filled with 10 M methanol aqueous solution. The concentration of each chamber was constantly maintained using a magnetic stirring bar. The sample of the chamber filled with distilled water was collected at regular time intervals using a 1 μl micro injector and analyzed in a gas chromatography equipped with a thermal conductivity detector.

In addition, in order to evaluate the methanol permeability depending on temperature, methanol crossovers of the samples were measured in a thermostat at a regulated temperature between 30–100° C.

Table 2 shows the methanol crossovers of the samples of Examples 1 to 5 (Examples 11–15). The values of Table 2 are % concentrations of methanol measured by GC after 1 week.

TABLE 2

| | * methanol concentration (%) measured by GC. | | | |
|---|---|---|---|---|
| | 30° C. | 45° C. | 60° C. | 75° C. |
| Example 11 | X | X | X | X |
| Example 12 | X | X | X | X |
| Example 13 | X | X | X | X |
| Example 14 | X | X | X | X |
| Example 15 | X | X | X | X |

X: undetected.

EXAMPLES 16–20

These Examples relate with the application of the sulfonated polyimide membranes according to the present invention as an ion exchange membrane of a direct methanol fuel cell.

The hydrolytic stability at high temperature conditions of the sulfonated polyimide membranes prepared from Examples 1–5, was evaluated by measuring the changes in outward appearance, weight, physical properties and proton conductivity after dipping the membranes in boiled water at 100° C. for 8 hrs. As a result, no significant changes were observed.

EXAMPLES 21–25

The Examples relate with the application of the sulfonated polyimide membranes according to the present invention as an ion exchange membrane of a direct methanol fuel cell.

The stability for peroxide radicals generated when a direct methanol fuel cell is operated, was evaluated for the sulfonated polyimide membranes prepared from Examples 1–5. The changes in outward appearance, weight, physical properties and proton conductivity of the membranes were measured after dipping them in a solution of 3 wt % of hydrogen peroxide and 0.1 wt % of ferrous ammonium sulfate at 70° C. for 8 hrs. As a result, no significant changes were observed.

COMPARATIVE EXAMPLE 1

The membrane made of Nafion 115 with the following structure (81) was used in order to compare its proton conductivities with those of the membranes according to the present invention.

(81)

The ion conductivities of the membrane under the same operation conditions as those for Example 6, were 20.1, 24.3, 30.2, 41.4 and 53.03($10^{-3}$ S/cm) at 30° C., 45° C., 60° C., 75° C. and 90° C.

When the membrane made of Nafion 115 was tested under the same condition of Example 11 for evaluating methanol crossover, the methanol concentration measured at 30° C. after 4 hrs was 40%.

COMPARATIVE EXAMPLE 2

The membrane prepared from sulfonated polysulfone with the following structure was prepared in order to compare its hydrolytic stability at high temperature conditions and peroxide radical stability with those of the membranes according to the present invention.

The hydrolytic stability at high temperature conditions was tested under the same conditions of operation as those for Examples 16–20. As a result, the membrane prepared from the sulfonated polysulfone was readily cracked.

In addition, the peroxide radical stability was tested under the same conditions of operation as those for Examples 21–25. Likewise, the membrane prepared from the sulfonated polysulfone was readily cracked.

COMPARATIVE EXAMPLE 3

The membrane prepared from sulfonated polyether ether ketone with the following structure was prepared in order to compare its hydrolytic stability at high temperature conditions and peroxide radical stability with those of the membranes according to the present invention.

The hydrolytic stability at high temperature conditions was tested under the same conditions of operation as those for Examples 16–20. As a result, the membrane was readily cracked.

The peroxide radical stability was tested under the same conditions of operation as those for Examples 21–25. Likewise, the membrane was readily cracked.

COMPARATIVE EXAMPLE 4

The membrane prepared from sulfonated polyether imide with the following structure was prepared in order to compare its hydrolytic stability at high temperature conditions and peroxide radical stability with those of the membranes according to the present invention.

The hydrolytic stability at high temperature was tested under the same conditions of operation as those for Examples 16–20. As a result, the membrane was readily cracked.

The peroxide radical stability was tested under the same conditions of operation as those for Examples 21–25. Likewise, the membrane was readily cracked.

As described above, the sulfonated polyimides according to the present invention in which the main chains of the polyimides are crosslinked and the sulfonic acid groups are effectively introduced, can be applied to polymer electrolyte membranes for direct methanol fuel cell, because they have excellent proton conductivities like Nafion type perfluorinated polymers which are known to exhibit the highest performances in the art, without the concern of methanol crossover.

In addition, since the present invention uses inexpensive monomers and the introduction of sulfonic acid group is easy, it is expected that the present invention contributes to mass production of the membranes in an industrial scale.

The invention claimed is:

1. A sulfonated polyimide comprising the repeating units of Formula 2, (Formula 2)

wherein $A_1$ and $A_2$ is identical or different, and each represents i) a tetravalent aromatic radical which includes at least one aromatic carbon ring having 6 to 10 carbon atoms and is substituted by one or more substituents chosen from among alkyl groups and alkoxy groups having 1 to 10 carbon atoms and halogen atoms, or ii) a tetravalent aromatic radical which includes at least one aromatic carbon ring having 5 to 10 atoms including one or more heteroatoms chosen from among S, N and O and is substituted by one or more substituents chosen from among alkyl groups and alkoxy groups having 1 to 10 carbon atoms and halogen atoms;

$Ar_1$ is a mixture of divalent aromatic radicals substituted by —CO— group or —O— group;

$Ar_2$ represents i) a divalent aromatic radical which includes at least one aromatic carbon ring having 6 to 10 carbon atoms and is substituted by one or more substituents chosen from among alkyl groups and alkoxy groups having 1 to 10 carbon atoms and halogen atoms, or ii) a divalent aromatic radical which includes at least one aromatic carbon ring having 5 to 10 atoms including one or more heteroatoms chosen from among S, N and O and is substituted by one or more substituents chosen from alkyl groups and alkoxy groups having 1 to 10 carbon atoms and halogen atoms;

B represents a divalent aliphatic radical with a N atom having a —SO.sub.3H group and two or more groups chosen from among —O— group and —CO— group; and the repeating number x represents a whole number from 2 to 20 and the repeating number y represents a whole number from 2 to 30.

2. The sulfonated polyimide according to claim 1, wherein its molecular weight is from 10,000 to 100,000.

3. The sulfonated polyimide according to claim 1, wherein $A_1$ and $A_2$ is identical or different, and each represents i) a benzene ring substituted by one or more substituents chosen from among alkyl groups and alkoxy groups having from 1 to 10 carbon atoms and halogen atoms, or ii) two or more benzene rings substituted by one or more substituents chosen from among alkyl and alkoxy groups having from 1 to 10 carbon atoms and halogen atoms, and wherein the benzene rings are linked to one another by two or more single bonds or divalent groups;

$Ar_1$ is a mixture of divalent aromatic radicals which includes —CO— group or —O— group;

$Ar_2$ represents i) a divalent aromatic radical which includes at least one aromatic carbon ring having 6 to 10 carbon atoms and is substituted by one or more substituents chosen from among alkyl groups and alkoxy groups having 1 to 10 carbon atoms and halogen atoms, or ii) a divalent aromatic radical which includes at least one aromatic carbon ring having 5 to 10 atoms and one or more heteroatoms chosen from among S, N and O, and is substituted by one or more substituents chosen from among alkyl groups and alkoxy groups having 1 to 10 carbon atoms and halogen atoms; and B represents a divalent aliphatic radical with a N atom, having a —SO.sub.3H group and two or more groups chosen from among —O— group and —CO— group.

4. The sulfonated polyimide according to claim 1, wherein the polyimide is crosslinked by the two or more groups chosen from among hydroxyl group and carbonyl group of B.

5. The sulfonated polyimide according to claim 3, wherein $Ar_2$ represents:

(i) a divalent aromatic radical which includes at least one aromatic carbon ring having 6 to 10 carbon atoms and is substituted by one or more substituents chosen from among alkyl groups having 1 to 10 carbon atoms and halogen atoms chosen from F, Cl, Br, I; or (ii) a divalent aromatic radical which includes at least one aromatic carbon ring having 5 to 10 atoms and one or more heteroatoms chosen from among S and O and is substituted by one or more substituents chosen from alkyl groups and alkoxy groups having 1 to 10 carbon atoms and halogen atoms.

6. The sulfonated polyimide according to claim 3, wherein $Ar_1$ is a benzene ring with —CO— group and $Ar_2$ is a diphenyl ether group.

7. The sulfonated polyimide according to claim 1, wherein $Ar_1$ is a benzene ring with —CO— group and the $Ar_2$ is a benzene ring.

8. The sulfonated polyimide according to claim 1, wherein $Ar_1$ is a benzene ring with —CO— group and $Ar_2$ is a diphenyl methane group.

9. The sulfonated polyimide according to claim 1, wherein $Ar_1$ is a benzene ring with —CO— group and $Ar_2$ is diphenyl disulfonic acid group.

10. The sulfonated polyimide according to claim 1, wherein $A_1$ and $A_2$ are two benzene rings linked to each other by a carbonyl group.

11. The sulfonated polyimide according to claim 1, wherein $A_1$ and $A_2$ are benzene rings linked to each other by one or more divalent perfluoroalkylene groups.

12. The sulfonated polyimide according to claim 1, wherein $A_1$ and $A_2$ are both benzene rings.

13. The sulfonated polyimide according to claim 1, wherein $A_1$ and $A_2$ are both naphthalene rings.

14. The sulfonated polyimide according to claim 1, wherein $A_1$ and $A_2$ are both benzene rings linked to each other by a sulfonyl group.

15. The sulfonated polyimide according to claim 1, wherein $A_1$ is a benzene ring and the $A_2$ is two benzene rings linked to each another by a carbonyl group.

16. The sulfonated polyimide according to claim 1, wherein $A_1$ is a benzene ring and the $A_2$ is two or more benzene rings linked to one another by two or more divalent perfluoroalkylene groups.

17. The sulfonated polyimide according to claim 1, wherein $A_1$ is two benzene rings linked to each other by a carbonyl group and $A_2$ is two or more benzene rings linked to one another by one or more divalent perfluoroalkylene groups.

18. The sulfonated polyimide according to claim 1, wherein $Ar_1$ is a benzene ring having —CO— group and $Ar_2$ is a diphenylthionyl group.

* * * * *